US012616160B2

(12) United States Patent
Van Den Berg et al.

(10) Patent No.: US 12,616,160 B2
(45) Date of Patent: May 5, 2026

(54) ANIMAL HUSBANDRY SYSTEM AND ILLUMINATION UNIT SUITABLE FOR THE SYSTEM

(71) Applicant: LELY PATENT N.V., Maassluis (NL)

(72) Inventors: Karel Van Den Berg, Bleskensgraaf (NL); Paulus Jacobus Maria Van Adrichem, Delfgauw (NL); Lucas Cornelis Maria Van Ruijven, 's Gravenzande (NL)

(73) Assignee: LELY PATENT N.V., Maassluis (NL)

( * ) Notice: Subject to any disclaimer, the term of this patent is extended or adjusted under 35 U.S.C. 154(b) by 240 days.

(21) Appl. No.: 18/549,208

(22) PCT Filed: Mar. 11, 2022

(86) PCT No.: PCT/IB2022/052195
§ 371 (c)(1),
(2) Date: Sep. 6, 2023

(87) PCT Pub. No.: WO2022/190050
PCT Pub. Date: Sep. 15, 2022

(65) Prior Publication Data
US 2024/0164342 A1 May 23, 2024

(30) Foreign Application Priority Data
Mar. 11, 2021 (NL) ..................................... 2027742

(51) Int. Cl.
*H04N 23/70* (2023.01)
*A01K 1/00* (2006.01)
(Continued)

(52) U.S. Cl.
CPC ................ *A01K 1/00* (2013.01); *A01K 29/00* (2013.01); *G01B 11/14* (2013.01); *F21V 7/00* (2013.01); *H04N 23/56* (2023.01); *H04N 23/70* (2023.01)

(58) Field of Classification Search
CPC .......... A01K 1/00; A01K 29/00; G01B 11/14; F21V 7/00; H04N 23/56; H04N 23/70
See application file for complete search history.

(56) References Cited

U.S. PATENT DOCUMENTS 10,894,503 B2 1/2021 Spero
2019/0384140 A1* 12/2019 Schulten ................ H04N 23/56
(Continued)

FOREIGN PATENT DOCUMENTS

WO WO 2009/028930 A1 3/2009
WO WO 2015/104250 A1 7/2015
(Continued)

OTHER PUBLICATIONS

Garcia et al, Counting Cattle in UAV Images—Dealing with Clustered Animals and Animal/Background Contrast Changes, 2020, Sensors, 20, 2126, pp. 1-14. (Year: 2020).*
(Continued)

*Primary Examiner* — Kathleen M Broughton
(74) *Attorney, Agent, or Firm* — Oblon, McClelland, Maier & Neustadt, L.L.P.

(57) ABSTRACT
An animal husbandry system for a group of animals that can move about freely in an area. The system contains at least one illumination unit, each illumination unit contains a mounting structure provided with a number of illumination elements, and each is arranged for illuminating a respective subarea. The system also contains at least one camera arranged for monitoring a number of subareas, where the camera(s) is (are) arranged for repeatedly determining the
(Continued)

illumination intensity at one or more reference surfaces in the area. The system further contains a control means, operatively connected to the illumination elements and to the camera(s), and the control means is programmed for adjusting the illumination elements, based upon the determined illumination intensity at the reference surface(s), in such a way that a predetermined desired illumination intensity pattern is achieved in the area.

20 Claims, 3 Drawing Sheets

(51) Int. Cl.
A01K 29/00     (2006.01)
G01B 11/14     (2006.01)
*F21V 7/00*     (2006.01)
*H04N 23/56*     (2023.01)

(56)                 References Cited

U.S. PATENT DOCUMENTS

2021/0112647 A1 *     4/2021     Coleman ................. F21V 14/02
2025/0113805 A1 *     4/2025     Van Den Berg ..... H05B 47/115

FOREIGN PATENT DOCUMENTS

WO         WO-2017135849 A1 *     8/2017     ............. F21V 29/89
WO         WO 2020/025320 A1     2/2020

OTHER PUBLICATIONS

International Search Report Issued Jun. 14, 2022, in PCT/IB2022/052195, filed on Mar. 11, 2022, citing documents 1 & 15-17 therein, 3 pages.

* cited by examiner

ANIMAL HUSBANDRY SYSTEM AND ILLUMINATION UNIT SUITABLE FOR THE SYSTEM

This application is a 371 application of PCT/IB2022/052195 filed Mar. 11, 2022, and claims benefit of NL 2027742, filed Mar. 12, 2021. The contents of each of these applications are incorporated herein by reference.

The present invention relates to an animal husbandry system. Such systems are widely known in the art. Illumination plays an important role in such systems. WO2015/104250 discloses a method and system of rearing chickens in which a plurality of cameras is provided in a shed for monitoring the shed floor and adjusting the shed floor illumination. WO2014/118788 discloses an optical monitoring system for livestock in which various activities may be measured to determine the health state of the population of animals. Generally, an area with animals should be illuminated in dependence on the time of day, the season, the weather, etcetera.

There is a need for an improved system with an efficient illumination setting and calibration mechanism.

It is an object of the present invention to provide such an improved system.

The invention achieves the object at least in part by means of a system according to claim 1, in particular an animal husbandry system, wherein a group of animals can move about freely in an area, the system comprising at least one illumination unit, each illumination unit comprising a mounting structure provided with a number of illumination elements, each arranged for illuminating a respective sub-area, the system also being provided with at least one camera arranged for monitoring a number of subareas, wherein the camera(s) is (are) arranged for repeatedly determining the illumination intensity at one or more reference surfaces in the area, the system further comprising control means, operatively connected to the illumination elements and to the camera(s), the control means being programmed for adjusting the illumination elements, based upon the determined illumination intensity at the reference surface(s), in such a way that a predetermined desired illumination intensity pattern is achieved in the area.

In this way, a highly useful, versatile and user-friendly system is realized. The invention is based on the insight that a very simple, yet efficient and automated setting and calibration of the illumination intensity in an area with a group of animals can be achieved by making use of reference surfaces, such as, for example, body parts of the animals themselves. Such a reference surface is easy to use and can be used repeatedly. No additional sensors are needed.

The invention further relates to an illumination unit suitable for use in the system, wherein a camera is provided on the mounting structure of the illumination unit. Thus, a very efficient and practical, but also versatile, yet compact illumination unit is provided.

Suitable and advantageous embodiments are described in the dependent claims, as well as in the description below.

According to a first embodiment of the invention, the reference surface(s) is/are movable. A movable reference surface can not only be used repeatedly, but also by more than one camera. This improves the efficiency of the system.

In a further embodiment of the system, the reference surface(s) is (are) chosen on the body of at least one of the animals. This is a simple, yet highly practical implementation, as the animal(s) are likely to move about in most of the area.

Advantageously, if the animals are cows, the reference surface(s) is (are) chosen on the back of the cow(s). It has been found that this body part of the cow, which is normally moved at a leisurely pace, is easily and reliably detectable by the camera(s) and therefore highly suitable as a reference surface.

In a further embodiment of the system, wherein an unmanned vehicle can be moved about in the area, the reference surface(s) is (are) being chosen on the unmanned vehicle. Such a vehicle, for example used for cleaning purposes, will normally move about and visit each and every corner of the area, making it also suitable to serve as a reference surface.

According to a further embodiment, the illumination elements in the system each comprise an LED module. This is a straightforward but highly practical implementation.

In yet a further embodiment, the control means are programmed for adjusting at least a number of the illumination elements periodically. This ensures an efficient and automated calibration of the illumination elements.

Advantageously, the control means are programmed for adjusting at least a number of the illumination elements only if at least a minimum threshold difference between the determined illumination intensity in a subarea and the respective predetermined desired illumination intensity in that subarea has been established during at least a minimum threshold time. In this way, sudden, short disturbances of the predetermined desired illumination intensity pattern (cause e.g. by a cloud passing by) are filtered out, thus eliminating unwanted, superfluous adjustments of the illumination elements.

In a still further embodiment of the system, wherein LED modules of different colours are used, the camera(s) is (are) used for determining the illumination intensity of said different colours at the one or more reference surfaces in the area, the control means adjusting the illumination elements accordingly. Optimal use of the camera(s) is thus made, leading to a precise adjustment.

In an embodiment of the illumination unit for use in the system, the illumination elements are arranged to illuminate subareas of the area in a substantially non-overlapping manner. This facilitates the achieving of the predetermined desired illumination intensity pattern and enhances the efficiency of the system.

In yet another embodiment, the illumination elements are each mounted on the mounting structure under a different angle, so as to achieve the illumination of the respective subareas. This is a technically simple but effective solution.

Advantageously, the illumination of the subareas is realised with the aid of lenses. This constitutes an efficient implementation.

In a further embodiment, the mounting structure is provided with cooling fins. In this way, the illumination unit can be efficiently cooled.

According to yet another embodiment, the camera(s) is (are) mounted substantially in the middle of the mounting structure, between the illumination elements. This is a practical implementation which enables the efficient determination of the illumination intensity.

The invention will now be further explained with reference to the following Figures, which schematically illustrate the system and the illumination unit according to the invention.

Figure 1:
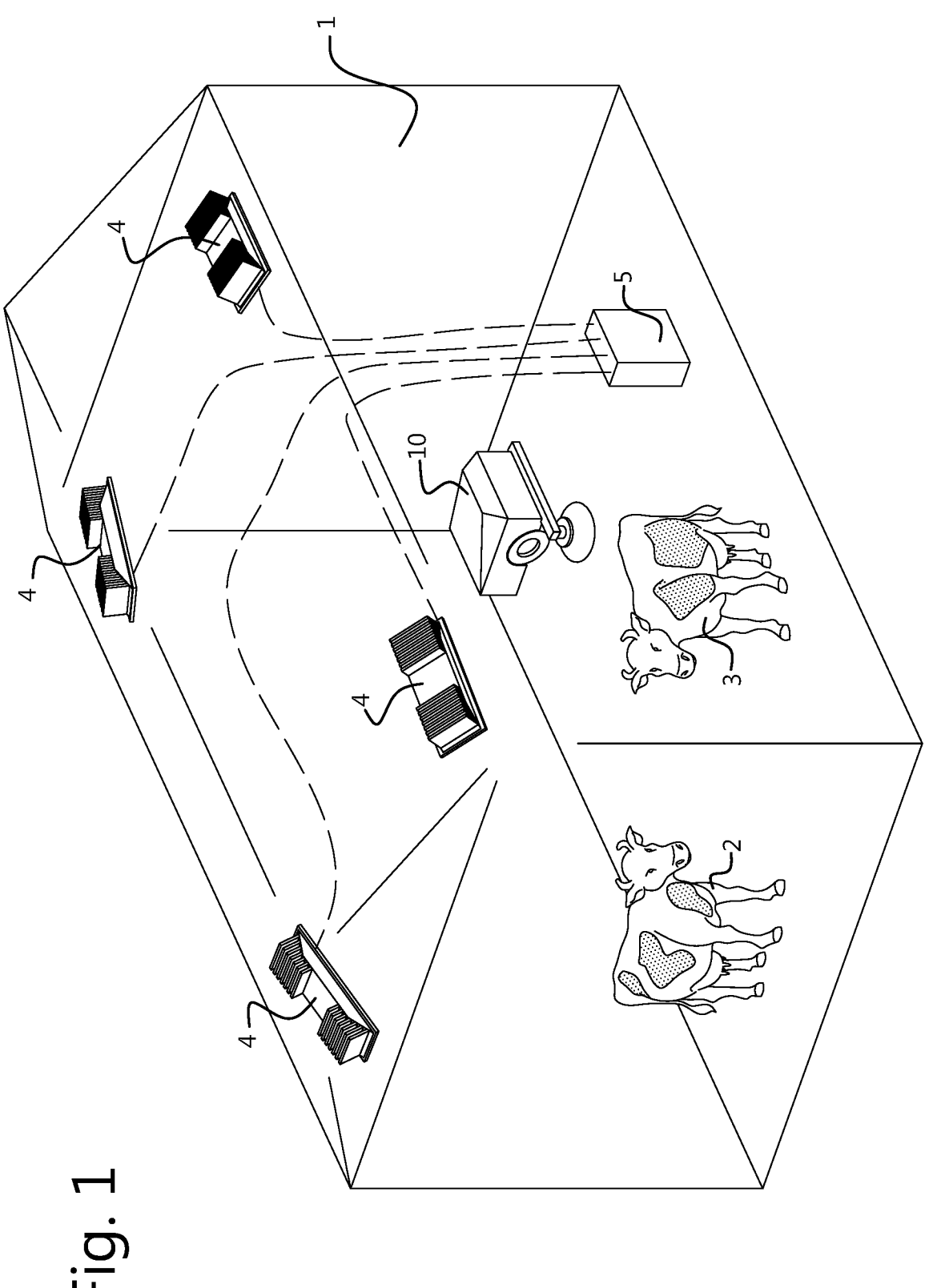
FIG. 1 shows a shed with a system according to the invention.

FIG. 1 shows an animal husbandry system with a stable or shed or barn 1 wherein a group of animals 2, 3 can move about freely. In the example shown the animals are cows. Of course, the invention can also be applied to an animal husbandry system involving other animals, such as goats, pigs, horses, chickens, turkeys, etcetera. The shed 1 can also be a structure with, for example, a partly open roof. The system according to the invention can in principle also be applied in an open area like a meadow or pasture with cattle fences.

When keeping animals 2, 3, it is often desirable to provide a specific illumination. For example, the animals' diurnal rhythm can be influenced by providing a daylight type of illumination during a certain number of hours. Also, a nocturnal illumination may be provided, which does not disturb the animals, e.g. red night light in a cow shed 1, which still enables the observation of the animals 2, 3 at night.

Generally, it is desirable to provide a constant illumination intensity, not only for animal welfare, but also for energy efficiency reasons. Moreover, this facilitates the monitoring of the animals 2, 3 by enabling a uniform image quality. It is known to provide a certain predetermined desired illumination intensity pattern in an area 1 where animals 2, 3 are held. Such an illumination pattern must be predetermined, set and maintained by means of calibration and adjustment in dependence on and in reaction to external influences, e.g. the time of day, the season, the weather, temporary external light sources, full moon. Furthermore, in almost every practical stable configuration, overlapping light beams occur, creating undesirable overlit spots.

The invention provides an improved system with an efficient and precise illumination setting and calibration mechanism. In the shed 1 a plurality of illumination units 4 is provided, suitable for illuminating respective different regions of the area or shed 1. A control unit 5 with processing means is also provided, operatively connected to the illumination units 4. The control unit 5 may comprise a computer or any processing means. It can also be located at a distance from the shed 1.

The illumination units 4 are provided with a camera 6 arranged for monitoring a region or a subarea or a number of subareas of the shed 1, as will be described below. Of course, other optical sensors can be used also. The illumination units 4 with their cameras 6 are provided in such a way that, collectively, they are suitable for illuminating and monitoring substantially the complete shed 1, particularly the animals 2, 3 and the shed floor. The illumination units 4 can be provided in the shed 1 above the animals 2, 3, as shown in FIG. 1, or on the walls of the shed 1. They are positioned and oriented in such a way that all relevant subareas of the area 1 can be illuminated. In case the invention is used in a pasture, for example for night illumination, the illumination units 4 may be provided on the fences, at a sufficient height above the ground.

As will be elucidated further below with reference to FIGS. 2, 3 and 4, the illumination units 4 are furthermore provided with a mounting structure 7 provided with a number of illumination elements 8, each arranged for illuminating a respective subarea of the shed 1. The subareas can slightly overlap, but they are substantially different. In this way, a very precise illumination pattern can be achieved in the whole area 1.

In accordance with the invention, the camera(s) 6 is (are) arranged for repeatedly determining the illumination intensity at one or more reference surfaces in the area 1. These reference surfaces are chosen in such a way that their colour is known, so that they can be used to calibrate the illumination. Knowing the exact colour of the reference surface and the shutter time of the camera 6, the greyness of the relevant image pixels can be determined, and thus the illumination intensity. The reference surface(s) are preferably movable.

The control means 5 are operatively connected to all the illumination elements 8 and to the camera(s) 6. They are programmed for adjusting the illumination elements 8, based upon the determined illumination intensity at the reference surface(s), in such a way that a predetermined desired illumination intensity pattern is achieved and maintained in the area 1. The pattern can, of course, vary in time. A regular calibration with the aid of the reference surface(s) ensures that the illumination pattern remains correct in the whole area 1 in the course of time.

The reference surface(s) can be chosen on the body of at least one of the animals 2, 3. This is advantageous, as the animal(s) 2, 3 are likely to move about in most of the area 1, so that a good calibration is achieved throughout the area 1. In case the animals are cows 2, 3, the reference surface(s) is (are) chosen on the back of the cow(s), for example white spots. It has been found that this body part of the cow 2, 3, which is normally moved at a leisurely pace, is easily and reliably detectable by the camera(s) 6 and therefore very suitable as a reference surface for calibrating the system. White parts of the skin on the back of the cows 2, 3 are particularly suitable, because their colour remains fairly constant in the course of time, unlike, for example, a (stationary) white reference surface accumulating dust and dirt.

An unmanned vehicle 10, for example used for cleaning purposes and known as such, can be moved about in the area 1 by means of the control means 5. In that case, the reference surface(s) can also be chosen on the unmanned vehicle 10. An upper surface (well visible for the camera(s) (6)) with a known colour is suitable for this. The unmanned vehicle 10 will normally move about with the aid of its navigation system and visit each and every corner of the area 1, making it also suitable to serve as a reference surface for calibration purposes. The vehicle 10 can comprise sucking means suitable for sucking up dirt and a collector for collecting the dirt. Its drive means can be charged at a base station in, at or near the shed 1 with means for charging the vehicle's batteries (not shown, known as such).

Fixedly installed reference surfaces would also be possible in theory, but the system according to the invention with its movable reference surfaces does not need such additional hardware.

The control means 5 are programmed for adjusting at least a number of the illumination elements 8 periodically. This ensures an efficient and automated calibration of the system.

The control means 5 are also programmed for adjusting at least a number of the illumination elements 8 only if at least a minimum threshold difference between the determined illumination intensity in a subarea and the respective predetermined desired illumination intensity in that subarea has been established during at least a minimum threshold time. In this way, sudden, short disturbances of the predetermined desired illumination intensity pattern (cause e.g. by a cloud passing by) are filtered out, thus eliminating unwanted, superfluous adjustments of the illumination elements 8.

Figure 2:
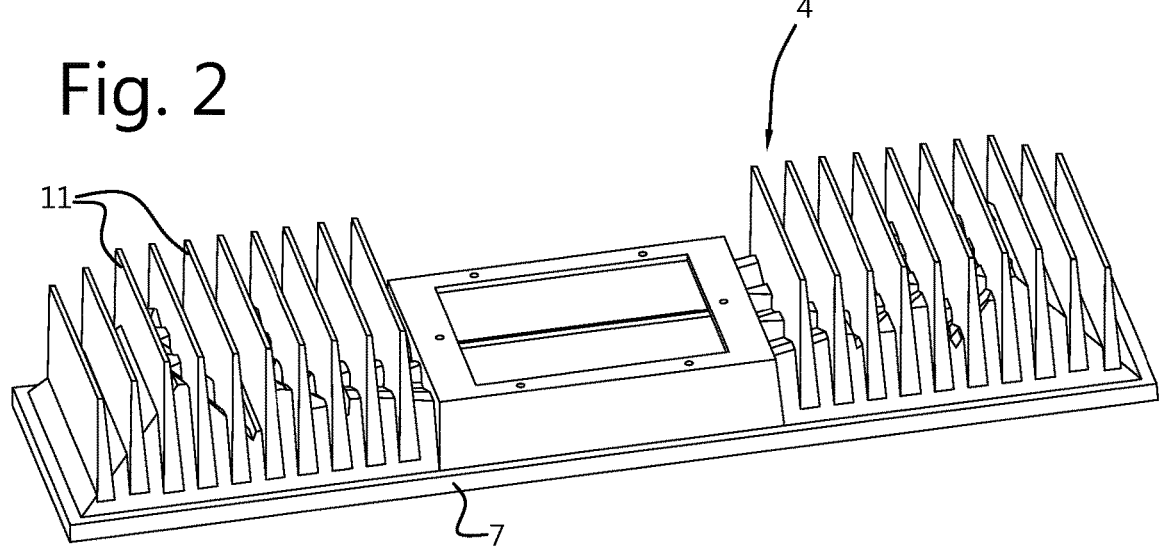
FIG. 2 shows a first view of an illumination unit according to the invention.
Figure 3:
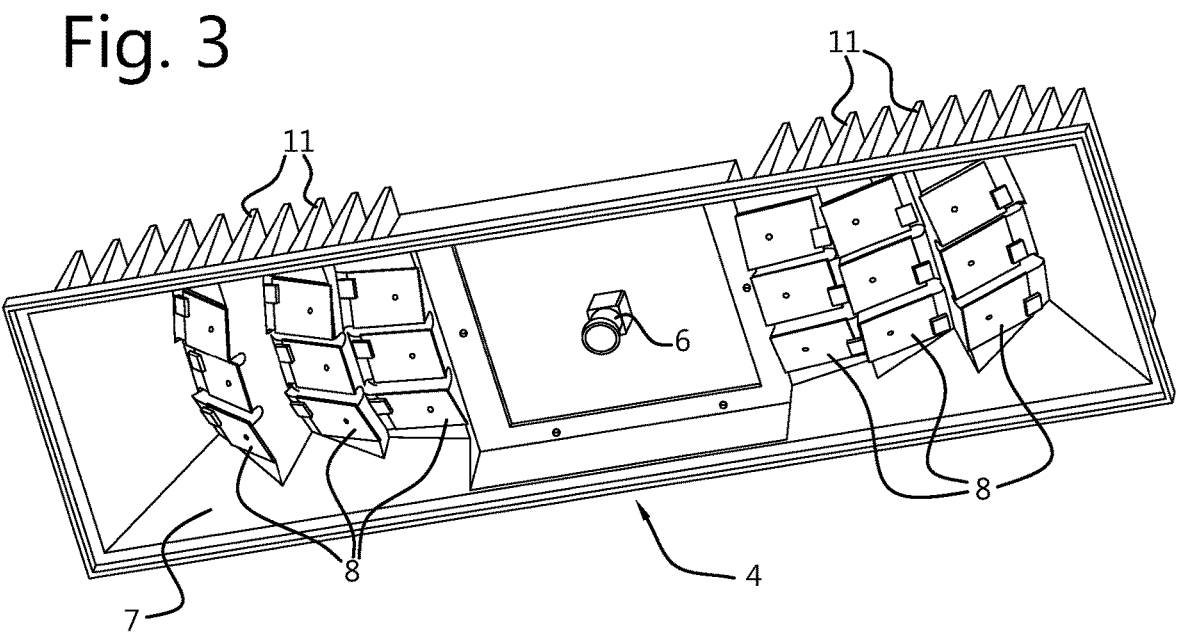
FIG. 3 shows a second view of an illumination unit according to the invention.

In FIG. 2 a first view of the illumination unit according to the invention is shown. It is a perspective view of the top side. FIG. 3 shows a second view of the illumination unit according to the invention. This is a perspective view from below.

The illumination unit 4 has a mounting structure 7, on the upper side of which cooling fins 11 for an efficient cooling of the unit 4 are provided. On the bottom side of the mounting structure 7 the illumination elements 8 and the camera 6 are provided. Typically, the illumination elements 8 each comprise an LED module. This constitutes a straightforward, yet highly practical implementation.

For example, two 3-by-3 arrays of illumination elements 8 are mounted on the mounting structure 7. The illumination elements 8 are each mounted on the mounting structure 7 under a different angle, so as to achieve the illumination of the respective subareas. This is a technically simple but effective solution. Alternatively (not shown in the Figures), the illumination elements 8 can be simply mounted on the mounting structure 7 in a parallel fashion, lenses being used to provide the required different angles of the light beams.

The camera(s) 6 is (are) mounted substantially in the middle of the mounting structure 7, between the illumination elements 8. This is a practical implementation which enables the efficient determination of the illumination intensity. Typically, one camera 6 is provided per illumination unit 4, suitable for monitoring substantially all of the subareas illuminated by the illumination elements 8 of the respective illumination unit 4. But, of course, other configurations are also possible.

In the example shown, there are four illumination units 4, each covering roughly one fourth of the total area 1. The chosen configuration obviously depends on the shape of the area or shed 1.

In an embodiment wherein LED modules of different colours are used, the camera(s) 6 is (are) used for determining the illumination intensity of said different colours at the one or more reference surfaces in the area 1, the control means 5 adjusting the illumination elements 8 accordingly. Optimal use of the camera(s) 6 is thus made, leading to a precise adjustment.

Figure 4:
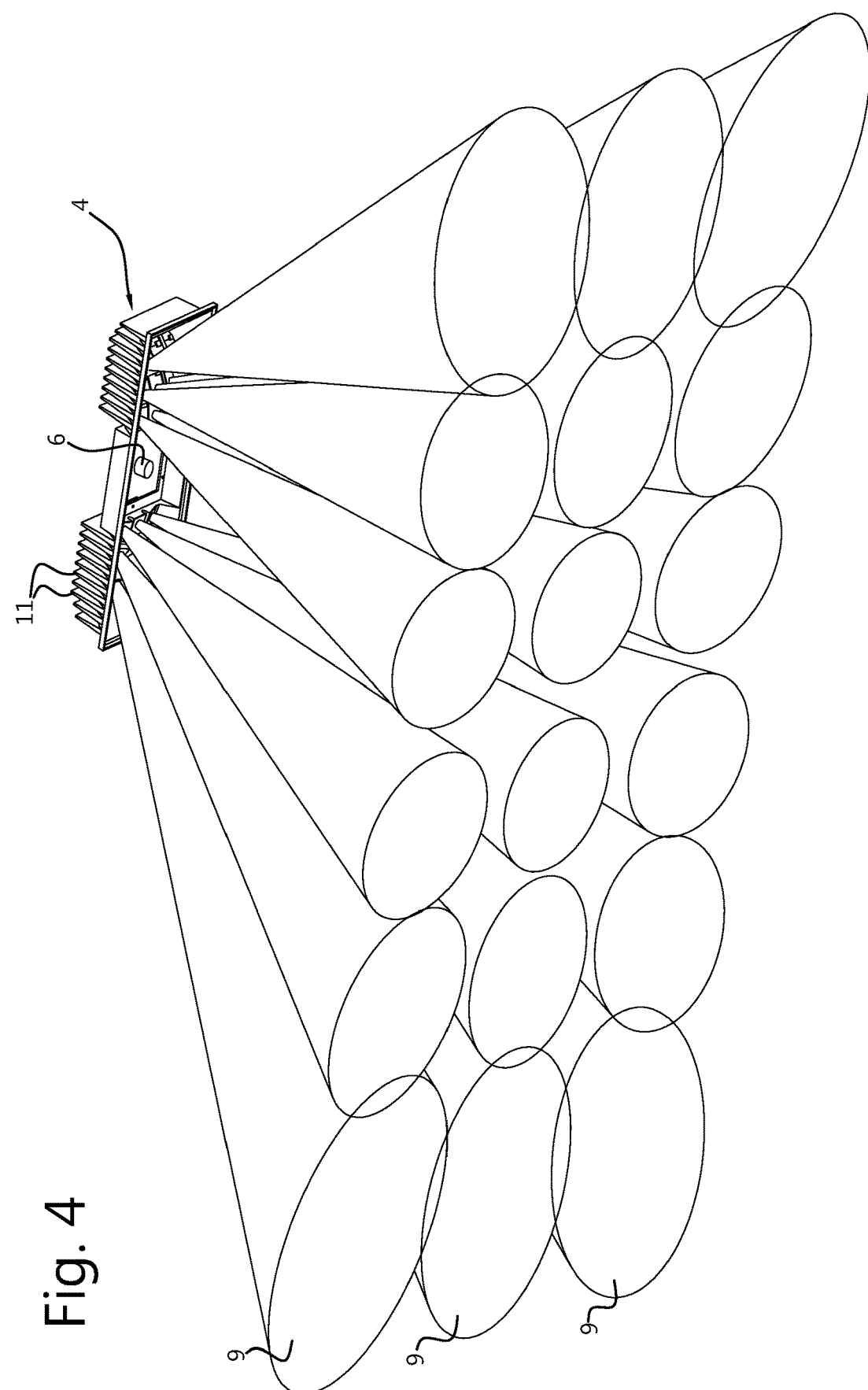
FIG. 4 shows an illumination unit with light beams.

In FIG. 4 an illumination unit 4 with light beams 9 is depicted in a perspective view from below.

As illustrated, in the illumination unit 4, the illumination elements 8 are arranged to illuminate subareas of the area 1 in a substantially non-overlapping manner. This facilitates the achieving of the predetermined desired illumination intensity pattern and enhances the efficiency of the system.

The illumination of the subareas can best be realised with the aid of lenses. This constitutes an efficient implementation. For example, in case the illumination elements 8 are mounted on the mounting structure 7 under different angles, the outer illumination elements 8 naturally illuminate a greater surface than the inner ones, as can be seen in FIG. 4. To compensate for this, lenses can be used, in a manner known per se.

Alternatively, in case the illumination elements 8 are mounted on the mounting structure 7 in a parallel fashion, lenses can be used to provide the required different angles of the light beams 9.

Should an illumination overlap occur somewhere, for example if two illumination elements 8 cover a same subarea, then the system solves this, as soon as the measurements in the reference surfaces indicate that overlapping light beams 9 occur. The undesirable overlit spots are automatically eliminated by the control means 5. Alternatively, highlighting a certain subarea is also possible, if the predetermined desired illumination intensity pattern requires this.

As an additional calibration possibility, all illumination elements 8 can be activated simultaneously, for example at night. The resulting known light intensity can be used as a reference.

Thus, the system is suitable for adjusting repeatedly and automatically, based upon the determined illumination intensity at the (movable) reference surface(s), at least those respective illumination element(s) 8 for the respective subarea(s) where the illumination intensity has been found to deviate from the desired predetermined illumination intensity pattern.

The invention claimed is:

1. An animal husbandry system, wherein a group of animals can move about freely in an area, the system comprising:

at least one illumination unit, each illumination unit comprising a mounting structure provided with a number of illumination elements, each arranged for illuminating a respective subarea, at least one camera arranged for monitoring a number of subareas, wherein the at least one camera is arranged for repeatedly determining an illumination intensity at one or more reference surfaces in the area, control means, operatively connected to the illumination elements and to the at least one camera, the control means being programmed for adjusting the illumination elements, based upon the determined illumination intensity at the one or more reference surfaces, in such a way that a predetermined desired illumination intensity pattern is achieved in the area, wherein the animals in the group of animals are cows, and the one or more reference surfaces are chosen on a back of the cow(s).

2. The animal husbandry system according to claim 1, wherein the one or more reference surfaces are movable.

3. The animal husbandry system according to claim 1, wherein the illumination elements each comprise an LED module.

4. The animal husbandry system according to claim 1, wherein the control means are programmed for adjusting at least a number of the illumination elements periodically.

5. The animal husbandry system according to claim 1, wherein the control means are programmed for adjusting at least a number of the illumination elements only if at least a minimum threshold difference between the determined illumination intensity in a subarea and the respective predetermined desired illumination intensity in that subarea has been established during at least a minimum threshold time.

6. The animal husbandry system according to claim 1, wherein the illumination elements comprise LED modules of different colours, the at least one camera is configured to determine the illumination intensity of said different colours at the one or more reference surfaces in the area, and the control means is configured to adjust the illumination elements accordingly.

7. An illumination unit suitable for use in the animal husbandry system according to claim 1, wherein a camera is provided on the mounting structure of the illumination unit.

8. The illumination unit according to claim 7, wherein the illumination elements are arranged to illuminate subareas of the area in a substantially non-overlapping manner.

9. The illumination unit according to claim 8, wherein the illumination elements are each mounted on the mounting structure under a different angle, so as to achieve an illumination of the respective subareas.

10. The illumination unit according to claim 9, wherein the illumination of the subareas is realised with an aid of lenses.

11. The illumination unit according to claim 7, wherein the mounting structure is provided with cooling fins.

12. The illumination unit according to claim 7, wherein the camera is mounted substantially in a middle of the mounting structure, between the illumination elements.

13. An animal husbandry system, wherein a group of animals can move about freely in an area, the system comprising:

at least one illumination unit, each illumination unit comprising a mounting structure provided with a number of illumination elements, each arranged for illuminating a respective subarea, at least one camera arranged for monitoring a number of subareas, wherein the at least one camera is arranged for repeatedly determining an illumination intensity at one or more reference surfaces in the area, control means, operatively connected to the illumination elements and to the at least one camera, the control means being programmed for adjusting the illumination elements, based upon the determined illumination intensity at the one or more reference surfaces, in such a way that a predetermined desired illumination intensity pattern is achieved in the area, wherein an unmanned vehicle can be moved about in the area, and the one or more chosen reference surfaces are on the unmanned vehicle.

14. The illumination unit according to claim 13, wherein the unmanned vehicle is a cleaning vehicle.

15. The illumination unit according to claim 13, wherein the animals in the group of animals are cows.

16. The animal husbandry system according to claim 13, wherein the illumination elements each comprise an LED module.

17. The animal husbandry system according to claim 13, wherein the control means are programmed for adjusting at least a number of the illumination elements periodically.

18. The animal husbandry system according to claim 13, wherein the control means are programmed for adjusting at least a number of the illumination elements only if at least a minimum threshold difference between the determined illumination intensity in a subarea and the respective predetermined desired illumination intensity in that subarea has been established during at least a minimum threshold time.

19. The animal husbandry system according to claim 13, wherein LED modules of different colours are used, the at least one camera being used to determine the illumination intensity of said different colours at the one or more reference surfaces in the area, and the control means adjusts the illumination elements accordingly.

20. An illumination unit suitable for use in the animal husbandry system according to claim 1, wherein a color of one or more of the reference surfaces is known.

\* \* \* \* \*